United States Patent [19]
Bartholomew et al.

[11] Patent Number: 5,147,429
[45] Date of Patent: Sep. 15, 1992

[54] MOBILE AIRBORNE AIR CLEANING STATION

[76] Inventors: James Bartholomew, 23000 Avenue San Luis #4, Woodland Hills, Calif. 91364; Dino M. Gentile, 21218 Lemarsh, Chatsworth, Calif. 91311

[21] Appl. No.: 506,197
[22] Filed: Apr. 9, 1990
[51] Int. Cl.⁵ .................. B01D 50/00; B01D 53/00; B64B 1/00; B64B 1/36
[52] U.S. Cl. .................. 55/356; 55/385.1; 55/385.3; 244/30; 244/52; 244/73 R
[58] Field of Search .............. 55/306, 385.1, 385.2, 55/210, 212, 270, 314, 315, 338, 428, 356, 385.3, DIG. 30; 244/29, 30, 52, 62, 73 R; 422/4, 120; 98/1

[56] References Cited
U.S. PATENT DOCUMENTS

| | | | |
|---|---|---|---|
| 2,468,021 | 4/1949 | Black | 55/356 |
| 3,059,470 | 10/1962 | Baldwin et al. | 55/270 |
| 3,152,777 | 10/1964 | McLean | 244/30 |
| 3,825,212 | 7/1974 | Darges et al. | 55/347 |
| 4,261,534 | 4/1981 | Roselli | 55/512 |
| 4,292,052 | 9/1981 | Cardullo | 55/212 |
| 4,364,532 | 12/1982 | Stark | 244/30 |

FOREIGN PATENT DOCUMENTS

| | | | |
|---|---|---|---|
| 124101 | 5/1947 | Australia | 55/306 |
| 703808 | 4/1966 | Italy | 55/356 |
| 2027403 | 2/1980 | United Kingdom | 244/29 |
| 2218354 | 11/1989 | United Kingdom | 55/385.3 |

Primary Examiner—Jay H. Woo
Assistant Examiner—James P. Mackey
Attorney, Agent, or Firm—James Bartholomew

[57] ABSTRACT

The airborne air cleaning station features a dirigible supporting a gigantic collector hood exteriorly mounted thereto, and an enlarged housing having a plurality of different types of air cleaning devices contained therein. The collector hood funnels polluted ambient air into an air intake system that places the on-board air cleaning devices in fluid communication with the collector hood. Sensors within the air cleaning station analyze an incoming air flow to determine the pollutants which need to be removed from the local atmosphere. Then, an automatic control system actuates automated valves of an on-board piping system to route incoming air to those air cleaning devices which are best equipped to remove whatever particular pollutants have been detected by the sensors. The inclusion of a plurality of different air cleaning devices, such as wet scrubbers, filtration machines, cyclonic spray scrubbers, etc. advantageously equips the airborne air cleaning station to deal with a wide variety of pollutants. An air exhaust system routes air which has been purified by the air cleaning devices back to the atmosphere. This is accomplished using movable exhaust ducts which are positionable to channel an exiting purified air flow in a desired direction, thereby enabling that exiting air flow to be harnessed as a secondary propulsion source for the dirigible.

7 Claims, 4 Drawing Sheets

MOBILE AIRBORNE AIR CLEANING STATION

BACKGROUND OF THE INVENTION

This invention relates generally to an air cleaning station designed for airborne use in pollution removal. More particularly, this invention relates to an air cleaning station that analyzes the pollution content of ambient air with sensor means, then utilizes automatic control means to direct ambient air from an intake air system to one or more selected air cleaning machines which effect pollutant removal while said air cleaning station is maintained in an airborne state by dirigible means. Effectiveness is enhanced because the control means automatically selects one or more of a plurality of different on-board air cleaning machines, using as its selection criteria, the qualities that each particular air cleaning machine offers for removing the particular pollutants identified by the sensor means.

The severity of the current air pollution crisis and the need for a new approach to pollution removal cannot be overstated. According to the EPA (Environmental Protection Agency), 4 out of every 10 Americans live in areas where the ambient air is often unhealthy to breathe. The U.S. Congress Office of Technology Assessment released a study estimating that 50,000 premature deaths annually in the U.S.A. and Canada are due to respiratory or cardiac problems attributed to air pollution. According to the South Coast Air Quality Management District of Calif., 1 in 10 people are extremely vulnerable to particulates from smokestacks, chimneys, diesel exhaust, blowing dust, etc. These particulates, which hang in the atmosphere to form a haze, are linked to cancer and present an extreme health threat to respiratory-impaired people.

The magnitude of pollutants released into our atmosphere yearly is staggering. In addition to the emissions from over 178 million motor vehicles, at least 2.4 billion pounds of toxic air pollutants are also released annually into the skies above North America. This ongoing fouling of our air manifests itself by triggering a host of destructive processes. Acid rain caused by air pollution threatens 9,000 lakes in 34 states. Air pollution, and in particular industrial chlorofluorocarbons, eat away earth's protective ozone layer at such a rapid rate that the EPA predicts millions of new skin cancer cases from an increase in ultraviolet radiation hitting the earth rather than being filtered out by ozone. Looming ominously ahead is the atmospheric greenhouse effect caused by air pollution, which, if unchecked, could lead to catastrophic droughts, glacier melting and subsequent flooding of coastal areas, and other disasterous effects.

A wide variety of air pollution control devices or air cleaning machines are already in use. Exemplary of such air pollution control devices are electrostatic precipitators, fabric filters and other filtration machines, wet scrubbers, mechanical particulate collectors, sorption process machines, and so on. However, the drawback of existing pollution control devices and methods is that current approaches are directed towards attempting to prevent additional pollutants from entering the atmosphere, rather than being focused on removing pollutants which have already entered the atmosphere. Prior air pollution control techniques attempt to neutralize air pollution while said pollution is in a zone defined between ground level and the height of industrial smokestacks. This is because the abovenoted pollution control devices are either land based, such as an electrostatic precipitator, or attached to the distal end of smokestacks, such as a scrubber. In general, the entire conventional approach of using land-based equipment to combat air pollution is grossly inadequate because, obviously, the majority of pollutants are suspended in the ambient air high above ground level, far beyond the range of pollution control devices which are conventionally employed. Applicants point to the ever worsening condition of our polluted atmosphere as proof that the current land-based strategy of air pollution control is outdated. What is needed is an entire rethinking of modern air pollution control strategies. The battleground for combatting air pollution must be moved into the sky itself! Whereas ground control of the release of additional pollutants into the atmosphere has been the thrust of man's efforts thus far, actual removal of existing pollution from high in the sky must now be undertaken. It is no longer merely enough to stem the flow of additional pollutants skyward; our present atmospheric state demands air pollution control strategies which provide for the positive removal of those pollutants which are already contaminating the skies—before our atmosphere is saturated with deadly toxins.

There exists, therefore, an urgent need for an air cleaning system which positions itself directly in smog, high above ground level. Such an air cleaning system should be transported aloft by flight means which do not require the burning of fossil fuels (and the subsequent accompanying polluting emissions) to achieve an airborne state. Moreover, such an airborne air cleaning system should have pilotable mobility for traveling directly into problem areas dense with pollutants, such as air pollution pockets created naturally by wind patterns and geography, or by chemical spills. Further, an airborne air cleaning system is needed which not only has the mobility to reach toxic clouds, but which also possesses the ability to hover indefinitely within a polluted area until clean-up is effected. Thus, yet another requirement is that such an airborne air cleaning system should be capable of remaining airborne for prolonged periods, preferably around-the-clock. Further still, due to the wide variety of pollutants which foul the atmosphere, an airborne air cleaning system is needed which provides a plurality of different air cleaning machines, then automatically activates one or more of whichever air cleaning machines are most appropriately suited for removing particular pollutants present in unhealthy concentrations. Thus, such an airborne air cleaning system should also provide sensor means for analyzing ambient air in order to detect the presence and/or concentration of particular pollutants. Moreover, such a needed airborne air cleaning system should not only produce a flow of purified air as an end product, but, ideally, should also harness this purified air flow as a secondary propulsion source which aids the primary flight means during steering, ascent and descent of the airborne system. Finally, an airborne air cleaning system is needed which accomplishes the above while not significantly adding noise pollution to the environment. The present invention fulfills these needs and provides further related advantages.

SUMMARY OF THE INVENTION

The present invention resides in an air pollution removal station which is maintained in an airborne state by flight means while one or more air cleaning devices provided in the pollution removal station treat the ambient air to remove impurities therein. The flight means generally comprises at least one dirigible having air intake means attached thereto so that the pollution removal station can collect ambient air for on-board treatment while in flight. A plurality of different air cleaning devices, such as wet scrubbers, adsorbent beds, wet cyclones, etc may be employed within the pollution removal station so that a variety of different toxics and suspended particulates can be efficiently removed from the sky. Movable air exhaust means are preferred so that a purified air flow exiting the pollution removal station can be selectively directed for use as a secondary propulsion force for the dirigible or dirigibles transporting the air cleaning devices.

The present invention provides an advantageous alternative to prior conventional, land-based methods of air pollution control because the airborne air pollution removal station positions itself in the sky directly within smog so that air pollution clean-up is effected within zones above ground which are heavy laden with toxins. This practice represents a radical departure from prior air pollution control methods which generally focus upon the prevention of interjecting additional pollutants into the sky, rather than focusing upon the removal of pollutants which are already present in the air high above ground level. Mere prevention or limitation of the release of additional pollutants skyward, as currently practiced, would suffice if the current quality of air everywhere was acceptable. However, the unhealthy state of the ambient air in regions throughout the United States indicates that emissions control alone is inadequate. Air pollution removal must be undertaken, and this mammoth task is best executed by the present invention which functions in the sky, high above ground level, rather than by prior pollution control devices which operate at ground level or at the distal end of smokestacks.

The present invention advantageously has airborne mobility so that the air pollution removal station can travel into problem areas dense with pollution such as pollution pockets created by wind patterns and geography. The present Mobile Airborne Air Cleaning Station, hereafter referred to as MAACS (pronounced MAX) is especially useful for quick clean-up response to a chemical gas leak at an industrial plant, for example, because MAACS is capable of extended hover times above spill sites having toxic gas/vapors. Further, MAACS can be anchored above a chemical accident area in the manner that conventional airships are tethered while airborne, until clean-up is completed.

The present invention's preferred use of at least one dirigible as flight means provides a number of advantages. Foremost among these is the fact that lighter-than-air craft using helium for lift do not pollute the atmosphere as jets, planes or helicopters do because fossil fuel burning is not required to remain aloft. This advantage translates into the achievement of prolonged airborne time (such as around-the-clock) by the dirigible-transported air pollution removal station of the present invention because landings for refueling are avoided by harnessing the bouyancy of helium. As a result, MAACS can hover in pollution zones for prolonged periods, while effecting clean-up in a manner which beneficially interjects very little noise pollution into the environment (as compared to the clamor created by jets, etc.). The utilization of dirigible means for hoisting skyward the air cleaning apparatus of the present invention provides superior hover and slow flight ability (again in comparison to most aircraft) for MAACS, thereby enhancing MAACS ability to sweep slowly through our atmosphere, vacuuming the air and removing pollutants suspended therein as it goes. Moreover, from a safety standpoint, modern airship technology has an exemplary safety record in comparison to planes, etc. It is for these reasons, in addition to the fact that helium filled dirigibles can lift fantastically heavy payloads (a 22,000,000 ft$^3$ airship can carry approximately 655,000 lbs. [295,000 kilograms]), that one or more dirigibles are the preferred flight means for propelling the air pollution removal station through our fouled skies.

On the subject of propulsion, yet another of the myriad advantages of MAACS is that the end product of the airborne treatment process executed by MAACS, namely a purified air flow, is harnessed by selectively directable, movable exhaust ducts as a secondary propulsion force for steering the dirigible and/or aiding in ascent or descent of MAACS. Further beneficial features of MAACS include sensor means for in-flight analysis of the polluted state of ambient air in a particular region, thereby gathering atmospheric data which, when inputted to on-board automatic control means provides a basis for determining the most effective cleaning approach offered by the various types of air cleaning devices aboard MAACS. The versatile nature of MAACS enables a selected few of the plurality of on-board air cleaning devices to be chosen for a particular environmental clean-up action, with the criteria of the selection process being the efficiency with which a particular air cleaning apparatus can process the local pollutants detected in the highest concentrations by the sensor means. Thus, the positive environmental impact and clean-up efficiency of MAACS is enhanced by its advantageous operational procedure whereby a particular pollutant is treated by that air cleaning device which is deemed to be most appropriate for removing that particular pollutant.

In a preferred form of the invention, MAACS is carried aloft during operation by dirigible means, such as a rigid airship having, preferably, an interior framework of titanium, or a non-rigid airship, preferably utilizing kevlar catenary cables. The dirigible means preferably includes an outer envelope having solar energy collector means incorporated therein. A housing is supported beneath the airship envelope and includes therein a plurality of passenger compartments, a plurality of air cleaning devices, and means for utilizing collected solar energy to power, at least in part, said air cleaning devices.

The air cleaning devices comprise a plurality of different types of pollution removal machines such as mechanical particulate collectors, filtration machines, sorption process machines, spray chambers, settling bins with internal impingement baffles, fabric filters with collection hoppers associated therewith, adsorbent beds (preferably disposable, activated carbon beds), wet scrubbers, fiber bed scrubbers, crossflow scrubbers (utilizing packing or fiber mesh), reactive scrubbing apparatus, mechanical scrubbing apparatus, and fog scrubbers. Since the afore-mentioned air cleaning devices have various efficiencies for removing various pollutants, the present invention incorporates several different types of air cleaning devices so that a wide range of pollutants may be removed from ambient air by MAACS. The types of air cleaning devices to be utilized aboard MAACS are selected according to the desired application of a particular MAACS. For example, a MAACS customized for cleaning up smog will feature air cleaning devices directed towards sulfur dioxide removal, while a MAACS customized for dealing with a chlorine gas spill may feature a caustic scrubber.

In general, a plurality of different air cleaning devices are provided in series aboard MAACS. An air intake system is provided which can direct ambient air to any selected air cleaning device in the series or which can bypass any air cleaning device in the series.

The efficiency of the present invention is enhanced by the provision of precollector means for removal of relatively large particulates from the atmosphere. These precollector means are positioned at the beginning of the afore-mentioned series of different air cleaning devices and function as a pretreatment step in the pollution removal process executed by MAACS. Preferred precollector means include impingement collector separators, baffle type separators and wet cyclones. When a wet cyclone is utilized aboard MAACS, at least one mist separator, entrainment separator or demister follows the wet cyclone in series. Efficiency of the air cleaning action executed by MAACS is further enhanced by the provision of mist eliminating means for removing entrained pollutants by impingement. Such mist eliminating means, for example, a mesh filter, is located at the very end of the series of air cleaning devices.

The air cleaning devices preferably include air washers comprising a hollow shell having a packed bed or fiber pad disposed therein, with a plurality of nozzles supplying an air-cleansing spray within the shell. Any of a wide variety of different wet scrubber devices are suitable for performing air pollutant removal aboard MAACS, however, whatever wet scrubber type is employed, MAACS, in a preferred form, provides onboard water treatment means for recycling water used as scrubber liquid. Moreover, waste storage means are associated with the air cleaning devices aboard MAACS so that pollutants removed from the atmosphere may be displaced (by a piping system) from the employed air cleaning devices to a central waste tank having drainage ports that facilitate disposal of waste once MAACS becomes saturated with pollutants after prolonged flight. The waste storage means includes one or more settling tanks.

The advantageousness of having a plurality of different air cleaning devices aboard MAACS is increased by the utilization of sensor means to match a particular type of air cleaning device with the pollutant that said air cleaning device is most effective in removing. The sensor means analyzes ambient air in a particular locale and detects the pollutants present in the greatest quantities, whether it be chlorine gas, sulfur dioxide, etc. Next, automatic control means operate in response to data inputted by the sensor means to actuate automated valves of a piping system connecting the air cleaning devices in series. This piping system, (part of the air intake system for directing ambient air to the air cleaning devices aboard MAACS) enables intake polluted air to be selectively directed to those on-board air cleaning devices which are most effective in processing whichever pollutants are present at a given time, as detected by the sensor means. Furthermore, the piping system, in conjunction with the automatic control means and automated valve arrangement, enables selected air cleaning devices to be bypassed from processing polluted air, if said air cleaning devices are deemed to be less appropriate for removing a particular local pollutant, in comparison to the capabilities of other on-board air cleaning devices. This feature ensures that MAACS operates in an energy conserving manner since, preferably, only those air cleaning devices which are most effective in neutralizing a particular local pollutant, for example, chlorine gas, are employed at a given time, while other types of on-board air cleaning devices which are more effective in neutralizing other pollutants, for example, sulfur dioxide, are bypassed and inoperative, thereby conserving power.

The air intake system includes a gigantic collector hood externally mounted to frontal portions of the dirigible means. The collector hood funnels ambient air into air intake ductwork that channels the contaminated air into selected air cleaning devices aboard MAACS. Once air has been processed by the air cleaning devices, an air exhaust system directs a purified air flow to the atmosphere. Motorized fans provide a positive air flow through both the air intake and the air exhaust systems.

Yet another advantageous feature of MAACS is the provision of movable exhaust ductwork and exhaust ports which are pivotably mounted to exterior, rearward portions of the dirigible means. The movable exhaust ducts are positionable by hydraulic arms and/or winches provided by the dirigible means. The mobility of the exhaust ducts beneficially allows the exiting purified air flow to be harnessed as a secondary propulsion force for steering the dirigible means. The externally mounted exhaust ducts are positioned to direct the purified air flow downwardly when the dirigible means is in an ascent mode and are positioned to direct the purified air flow upwardly when the dirigible means is in a descent mode. The dirigible means will experience a propelling boost in the direction which is opposite of the direction of flow of exhausted air.

The MAACS may also include gas preconditioning means such as condensers or preheaters to enhance the efficiencies of the on-board air cleaning devices. The housing accommodating the air cleaning devices is sized to provide auxiliary space so that other specialized air cleaning devices can be easily added for utilization in a specific crisis, such as a chemical spill. The envelope of the dirigible means is preferably provided with display means for conveying advertising or disaster information. For example, a plurality of light bulbs may be exposed at points along the envelope of the dirigible means. Sensor means are located at the exhaust end of the air cleaning system provided by MAACS so that a final quality check may be done on the ambient air which has been treated by MAACS. If predetermined air quality standards are not yet achieved, contaminated air may be recycled to selected air cleaning devices for additional treatment. This recycle pathway is provided by the aforementioned automated piping system which enables selected air cleaning devices to be utilized or bypassed based on their performance criteria.

Applicants submit MAACS as the most feasible way to utilize the U.S. government's vast stockpile of millions of cubic feet of helium in underground wells at Amarillo, Texas. This helium stockpile, which costs taxpayers millions annually just to maintain, could be put to effective use in initiating a massive airborne environmental clean-up program utilizing MAACS. The annual cost of storing helium would be better spent funding air pollution removal with helium-filled lighter-than-air craft. This approach is especially sound when one considers that modern airships have an exemplary safety record—better than airplanes in fact.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a side elevation view of a mobile airborne air cleaning system (MAACS) embodying the invention, showing an enlarged collector hood for air intake (indicated by arrows) at frontal portions of a dirigible, also illustrating a solar energy collector panel employed on envelope portions of the dirigible, and further depicting a movable air exhaust duct pivotably attached in a raised position to rear portions of the dirigible (and shown in phantom outline in a lowered position); FIG. 1 additionally illustrates a hydraulic arm and winch system for raising or lowering said movable exhaust duct and a housing with passenger compartments disposed beneath the dirigible envelope;

FIG. 5 is a rear elevation view of MAACS, illustrating the movable exhaust ducts (only one of which was visible in FIG. 1), the rear of the collector hood, and, in phantom outline, motorized gear means within the housing for positioning the movable exhaust ducts, and also in phantom, winches externally mounted to the dirigible also for positioning the exhaust ducts; FIG. 5 further showing dirigible features such as fins adjacent to the rear nose, propellors, and a passenger gondola.

DETAILED DESCRIPTION OF THE PREFERRED EMBODIMENT

Figure 1:
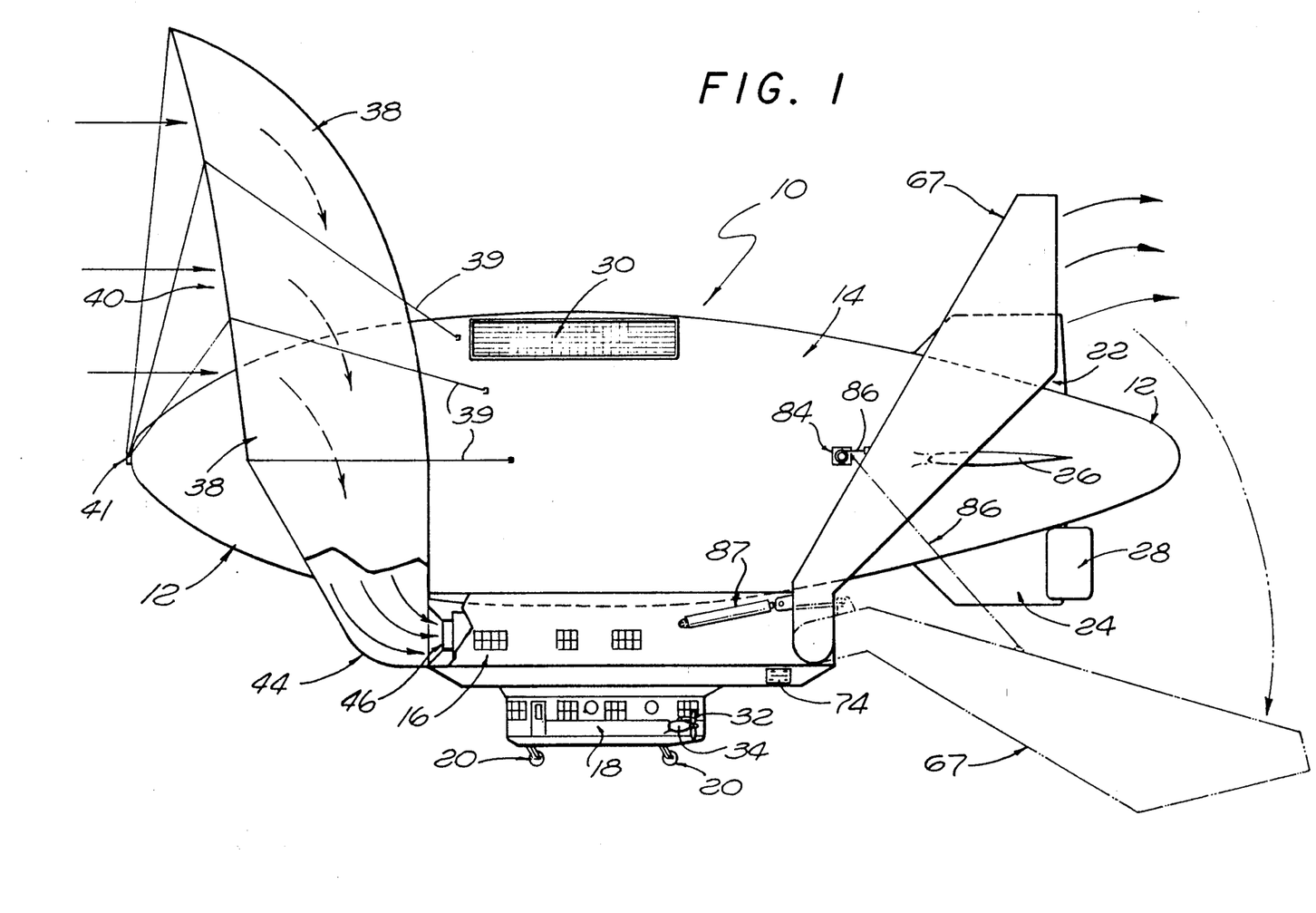

As shown in the drawings for purposes of illustration, the present invention resides in a mobile airborne air cleaning station, hereafter referred to as MAACS (pronounced "MAX"), shown in FIG. 1. MAACS is maintained aloft by one or more dirigibles while a plurality of on-board air cleaning devices operate to remove pollutants suspended in our atmosphere. A gigantic air intake collector hood funnels polluted ambient air to the air cleaning devices supported within a housing carried by dirigible means. Following treatment by the air cleaning devices, a purified air flow is directed to the atmosphere by giant movable exhaust ducts pivotably attached to the dirigible means. On-board sensors serve to both analyze polluted ambient air to enable appropriate on-board pollution equipment to be employed and to test treated air to ensure that a predetermined air quality is achieved before treated air is returned to the atmosphere.

The present invention pioneers an entire strategy for combatting air pollution—namely to make the skies themselves the new arena of environmental clean-up. Prior air pollution control techniques generally comprised a land-based effort to reduce emissions of additional pollutants into the atmosphere. The present invention represents a radical departure from those outdated pollution control strategies which have saddled society with its current air pollution crisis. MAACS embodies an advanced anti-air pollution strategy that comprises an airborne effort to remove pollutants currently fouling the air. The advanced state of the current global air pollution problem demands a rapid transition from pollution control strategies (merely limiting the release of addition pollutants into the air) to pollution removal strategies (actually undertaking to eliminate vast quantities of airborne poisons). In a broad sense, the present invention is intended to literally vacuum the pollutants out of the atmosphere using many of the sophisticated air cleaning devices which are conventionally employed at ground level.

The primary advantage of MAACS is that it presents an airborne station for treating the ambient air and removing pollutants therein. The entire world is in dire need of the present invention as earth's residents are currently choking beneath the toxic clouds encircling our planet. Beyond the breakthrough benefit provided by MAACS, namely the capability to carry the air pollution battle up into the sky itself, the present invention offers many other advantages. Among these advantages are prolonged flight times (due to helium usage), nonpolluting flight (again due to helium), little noise pollution emitted (especially in comparison with other airborne vehicles), mobility to travel to heavily polluted areas, exceptional hovering ability (for maintaining position above a chemical spill or other pollution crisis area), and provision of a plurality of different air cleaning machines so that MAACS has flexibility to remove a wide variety of pollutants. The present invention advantageously analyzes encountered pollutants so that an optimum treatment process can be selected, and also MAACS beneficially harnesses a purified air flow exiting therefrom for use as a secondary propulsion force for powering or steering the dirigible.

In accordance with the present invention, MAACS, generally indicated by reference numeral 10 in FIG. 1, is maintained aloft during operation by at least one dirigible 12 comprising a helium-filled envelope assembly 14 attached to a housing 16 having passenger compartments 18. The dirigible 12 includes conventional airship features such as landing wheels 20, an upper vertical fin 22, a lower vertical fin 24, a plurality of horizontal fins 26, an adjustable rudder 28 and other airship necessities (not shown) which are deemed to be conventional and do not constitute an inventive feature of this invention.

Applicants note that other flight means such as jets, helicopters, etc, could be adaptable for providing the lift component of MAACS, however, although alternative flight means adapted for use in MAACS are envisioned as being within the scope of the present invention, the use of the dirigible 12 is the preferred mode because the dirigible provides extended flight times with near around-the-clock airborne capability, lacks the poisonous polluting engine exhaust of fuel burning jets, for example, and requires little energy consumption to remain aloft, provides superior hovering capability as well as superior slow flight speeds (for slowly sweeping and cleaning areas dense with toxins), and can be mobilized to a site in need of atmospheric clean-up and then anchored above said polluted site until air pollution removal has been effected. Moreover, operation of a dirigible 12 introduces little noise pollution into the environment.

From an operational and safety standpoint, the dirigible 12 is ideally suited for use as the lift component of MAACS. The dirigibile 12 is built on a gigantic scale in order to provide tremendous lift capacity for hoisting the air cleaning devices accommodated within the housing 16. As an example of the lifting potential of dirigibles, consider that a 22 million cubic foot (660,000 cubic meters) airship is capable of lifting 655,000 pounds (295,000 kilograms). With the dirigible 12 of the present invention being envisioned as being hundreds of feet long, the airlift capacity of MAACS is more than sufficient for elevating the air cleaning components of MAACS.

Although nine airship accidents in the 20's and 30's had cast an unfavorable light on dirigibles as a viable means of air transportation, the two major factors involved in prior dirigible disasters, namely the use of explosive hydrogen gas and human error, have been antiquated by the emergence of non-flammable helium as the lifting gas and the development of modern navigation equipment. As proof of the exemplary modern safety record of dirigibles, Applicants point to the fact that Goodyear Company, using the latest navigational and safety devices, has conducted 45 years of operations utilizing lighter than air crafts, carrying over a million passengers without a single incident!! However, so that the dirigible 12 is especially adapted for safe use in air pollution removal processes, a number of additional safety provisions are in order.

Among the safety precautions recommended for enabling MAACS to make optimum usage of a dirigible for airborne mobility during air cleaning operations, the exposure of MAACS to potentially explosive gaseous pollutants during use of the invention in pollution removal is a potentially hazardous situation which must be anticipated by the inclusion of explosion-proof electrical motors, switches etc. throughout the air processing area within the housing 16. The electrical systems of MAACS are preferably enveloped with an inert gas blanket such as nitrogen to prevent sparks. Moreover, nonferrous alloy construction should be used throughout appropriate areas within the housing 16 in order to avoid sparking. Moreover, the envelope assembly 14 should be comprised of multi-cell air pockets for safety in case one or more air pocket cells are punctured or leaking. As a general safety guideline, when MAACS is operating in a sulfur dioxide atmosphere, for example, during cleaning of an area heavy laden with effluents of fossil fuel-fired power plants, the air intake and exhaust systems employed by MAACS must contain safety measures designed to prevent hazardous condensation that will result in sulfurous acid and sulfuric acid formation. Thus, a primary safety directive of the present invention is to prevent the condensation of flammable contaminants in ductwork, etc. so that potentially explosive or corrosive concentrations of pollutants are not built-up at any point aboard MAACS. Any conventional approach is suitable for executing the general safety measures discussed above.

In regard to construction guidelines for the dirigible 12, a rigid airship is preferred for the large sized dirigible required, although a non-rigid airship constructed with a KEVLAR (or generically speaking, an aramid material) envelope may be adapted for use in a smaller scale MAACS. The airship should be constructed using advanced materials including fiberglass, graphite, stainless steel, or titanium interior framing for reduced weight and added structural strength. The materials throughout MAACS should be selected for corrosion resistance (or treated to achieve same) due to the continual exposure of MAACS to contaminants. The envelope assembly 14 is preferably comprised of a composite of KEVLAR (i.e. an aramid material)/polyurethane/tedlar or tedlar/DACRON (i.e. a polyester material)-/dacron/polyurethane or even a polyethylene film. The housing 16, or gondola, supported beneath the envelope assembly 14 is provided with special sound-absorbing insulation to shield the crew aboard MAACS from noise generated by the on-board air cleaning devices.

Although illustrated in FIG. 1 as sausage-shaped, the dirigible 12 may be more efficient structurally and aerodynamically if circular or lens shaped with a generally circular perimeter. Such configurations may be preferred for carrying a massive payload, such as the housing 16 having air pollution removal equipment therein. In an alternative dirigible configuration, the housing 16 should be centrally located with dirigible means surrounding the housing in much the same way that a circular donut surrounds its central void. Multiple dirigibles may be utilized instead of one continuous circular airship. The housing 16 is attached to the dirigible 12 in a conventional manner, for example, with an internal catenary suspension system (if a non-rigid dirigible is employed), or with an exterior catenary installation and exterior suspension means. It is recommended that a rigid or semi-rigid dirigible be employed in which case an interior framework which rigidifies the envelope assembly 14 may be used to provide attachment points for the housing 16. Dirigibles have previously proven to be capable of carrying the large payload (comprising the housing and a plurality of air cleaning devices) contemplated in the present invention. For example, the U.S.S. Akron ZRS-4, Goodyear-Zeppelin C/N GZ-1 and its sister airship, the Macon were designed to carry five airplanes!

The dirigible 12 includes exteriorly mounted means for collecting solar energy, for example, one or more solar panels 30 attached to, or incorporated with, the envelope assembly 14. The solar panels 30 are operatively associated with means for utilizing collected solar energy to power the plurality of air cleaning devices aboard MAACS. The means for utilizing collected solar energy, comprising one or more generators, are provided within the housing 16. In this respect, any conventional technology for harnessing solar power may be employed aboard MAACS. Moreover, the envelope assembly 14 is provided with display means (not shown for clarity's sake) for conveying advertising or disaster information such as wind direction during a chemical gas leak. The display means can include hundreds of electric, solar powered light bulbs.

Propellors 32 are provided at exterior locations on the housing 16 as is conventional in dirigible technology. Preferably, an engine suspension system is utilized which will enable propellor power units 34 to be rotated 360 degrees so that the propellors 32 can be rotated to a downwardly-pointing orientation to provide additional lifting power when needed. As noted previously, other standard airship features such as a ballonet arrangement, catwalks, etc. are deemed to be conventional and do not constitute an inventive feature of this invention.

Figure 2:
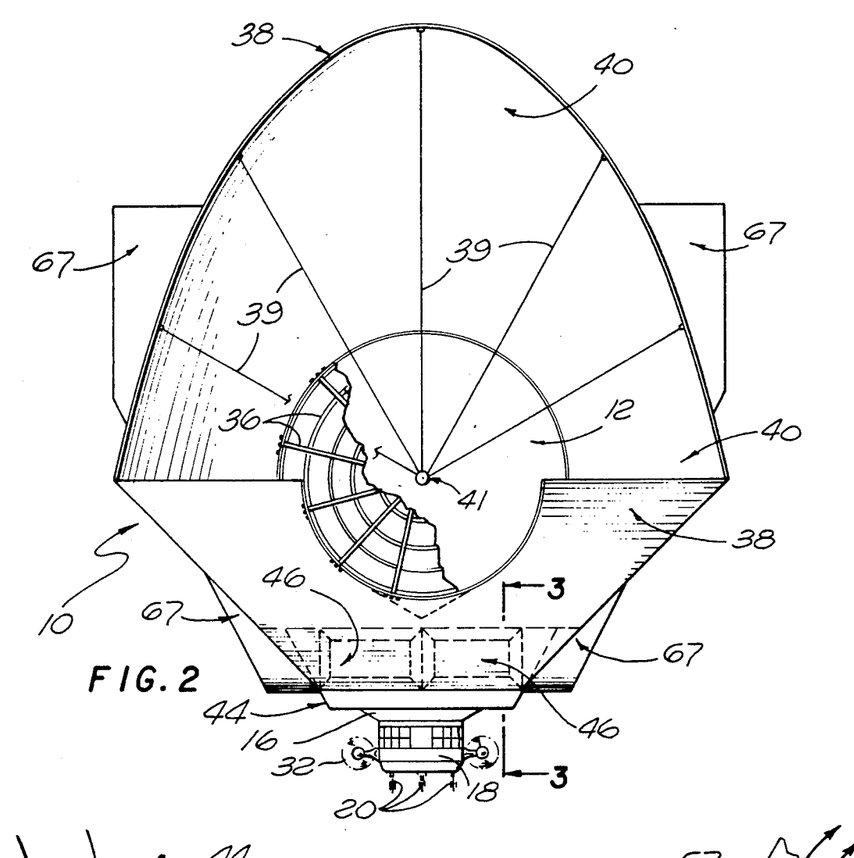
FIG. 2 is a front elevation view of the MAACS of FIG. 1, with the nose of the dirigible shown partly in cut-away to reveal a rigid interior dirigible framework to which the collector hood is anchored, also showing (in phantom outline) air intake ducts in fluid communication with the collector hood.

The dirigible 12 includes nose stiffening rigid framework 36, i.e. battens, interiorly located within conical frontal portions of the envelope assembly 14 so as to provide a supportive foundation for a gigantic collector hood 38 mounted thereto; as shown in FIG. 2. The collector hood 38 is stabilized by a plurality of suspension cables 39 which also serve to anchor the collector hood to a plurality of points along the internal framework 36 and to the nose 41 of the dirigible 12. The collector hood 38, which can be made of any rigid, preferably noncorrosive material, defines an extremely large air intake opening 40. As the dirigible 12 sweeps through the sky, polluted ambient air is captured by the collector hood 38 and enters the air intake system of MAACS through the air intake opening 40.

MAACS includes one or more conventional prime movers or draw motors 42 (FIG. 3) to promote air flow of polluted intake air through air intake ductwork 44 which places the collector hood 38 and air intake opening 40 in fluid communication with the air cleaning devices contained within the housing 16. The prime mover 42 can be on the suction side (preferred, as shown adjacent to air intake inlets 46 in FIG. 3) or on the discharge side. The burden of promoting an air intake flow into MAACS is, beneficially, not entirely upon the air intake system comprising the collector hood 38, the air intake ductwork 44 and one or more prime movers 42. Rather, in operation, the airship 12 transporting MAACS will be positioned in flight relative to the prevailing wind direction such that the wind is blowing pollution into the collector hood 38. Advantageously, the mobility of the air cleaning airship of the present invention enables wind and geography to be used favorably to funnel ambient air into the collector hood, thereby alleviating the burden of air intake on the draw motors 42.

The air intake system must include means for creating turbulence, such as auxiliary fans, to counteract the existance of any dead pockets in the air intake ductwork 44. Dead pockets, where polluted gas could collect in the ductwork, for example, in low spots or spots with very low turbulence, must be eliminated in order to avoid toxic gas build-up and an accompanying potentially explosive increase in contaminant concentrations. Since MAACS may be used in a cold climate with condensable contaminants in the air, any externally exposed ductwork 44 should be insulated and provided with a liquid drainage system in order to avoid condensation and accumulation of pollutants at low spots in the ductwork. As with toxic gas build-up, undesirable accumulation of toxic condensation must also be avoided to prevent the creation of high concentration zones which are potential explosion hazards. Liquid drainage outlets should be provided at low spots in the ductwork such as where indicated by reference numeral 48 in FIG. 3. These drainage outlets can be automatically opened to allow condensation to drain periodically. Solid deposits may have to be periodically removed from the interior of the air intake ductwork 44 or from air exhaust ductwork to be described hereinafter.

Closure means are provided for shutting the air intake opening 40 in case it is ever necessary for safety reasons to stop the flow of ambient air to the air cleaning devices aboard MAACS.

Figure 4:
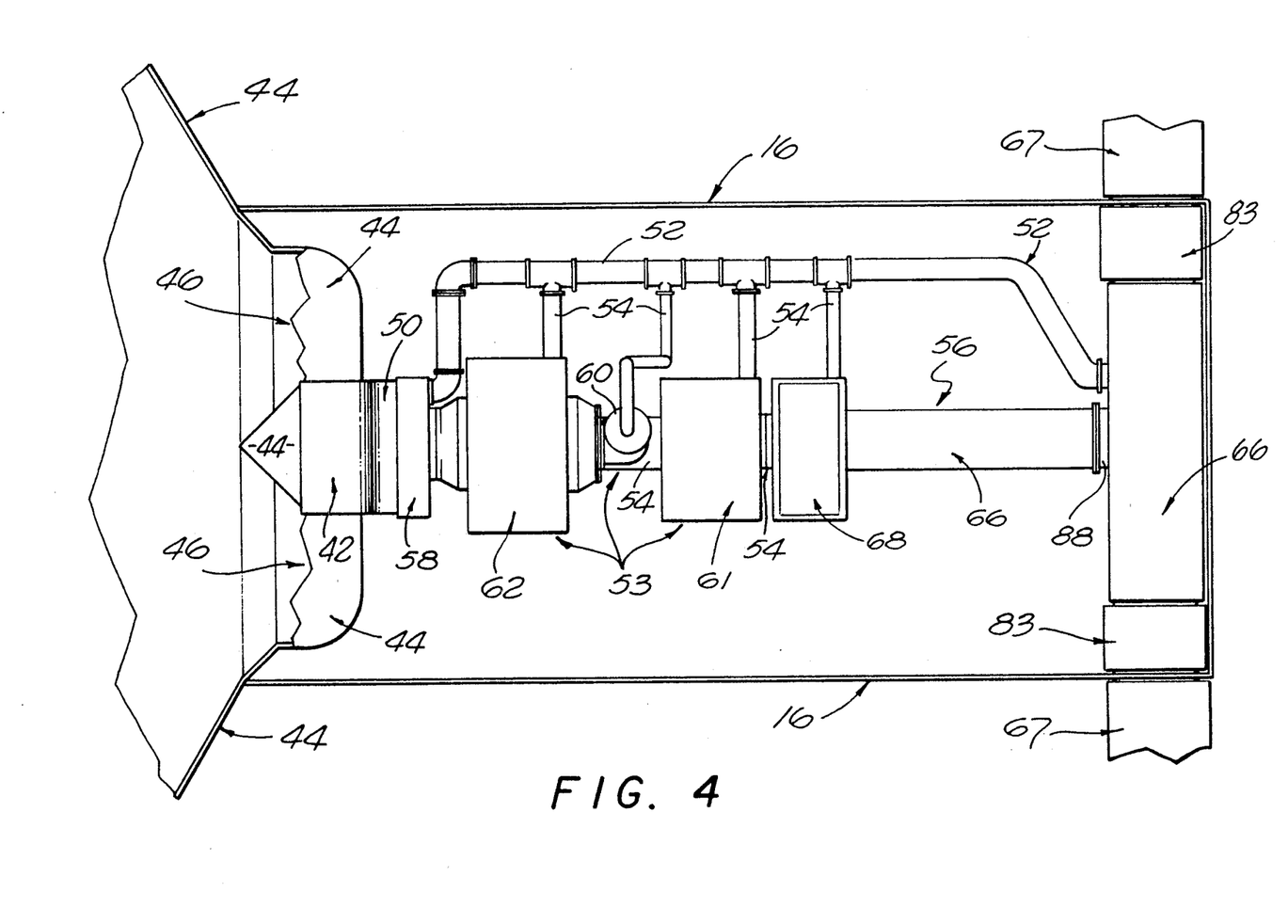
FIG. 4 is a top plan view of the different air cleaning devices of FIG. 3 (with said air cleaning devices being schematically represented rather than detailed to indicate that the rectangular air cleaning devices represent any of a broad spectrum of pollution equipment), illustrating junctions which place these air cleaning devices in fluid communication with the air intake ducts and the air exhaust ducts, and also showing a piping system which enables any selected air cleaning device to be bypassed by an intake air flow that is to be treated by MAACS.

The air intake system of MAACS funnels polluted ambient air to a piping system within the housing 16 (see FIG. 4). Sensor means 50 are provided at the inlet of the piping system so that polluted ambient air entering MAACS can be analyzed prior to treatment. The sensor means 50 comprises conventional equipment for determining the pressure and temperature of a polluted gas stream entering MAACS, the volume of intake air flowing, the composition, nature and concentrations of pollutants present in the ambient air, and fluctuations in pollutant concentrations. If a higher level of sophistication is desired, means for sensing particle size distribution, electrical charge, etc. may be provided.

Data collected by the sensor means 50 is inputted to automatic control means which can be located in control panels within the housing 16. The automatic control means function to select the most appropriate on-board air cleaning devices for treating ambient air laden with the particular pollutants detected by the sensor means 50. Thus, the control means includes memory means for storing preprogrammed responses detailing which particular air cleaning devices should be automatically activated and employed in response to the presence of particular atmospheric pollutants. Once a preprogrammed response has been chosen by the automatic control means (based on pollution data from the sensor means), automated valves of the on-board piping system are opened or closed to either route polluted air to an appropriate air cleaning device for treatment, or to direct polluted air to bypass an air cleaning device which may be inefficient or unappropriate for processing a particular pollutant encountered.

The selection of specific control technology is chosen with the following factors in mind:

1) the interfacing that is required between the control means and the automated valves in order to achieve an automated system whereby the valves selectively open or close to either direct an intake air flow through by-pass conduits 52 to circumvent one or more particular air cleaning devices 53 or through conduits 54 which direct air flow into a particular air cleaning device 53 (schematically shown in FIG. 4). Thus, the control means and automated valve system determine which air flow pathway will be defined by the piping system, thereby determining which air cleaning devices will be employed; and 2) the characteristics of the polluted intake air stream, more specifically its incoming rate, the composition and the distribution of pollutants in the air stream, and the spectrum of pollutants to be analyzed and processed with a predetermined, programmed response supplied by the control means. In this instance, the programmed response comprises the selection of an air cleaning device appropriate for removing a sensed gaseous toxin and the optimum order of use of a selected air cleaning device (when more than one type of air cleaning device is determined to be appropriate for pollution removal in a particular situation). Specific process control systems are well known to those skilled in that art and need not be specifically described herein. The automated on-board piping system comprising bypass conduits 52, conduits 54 in fluid communication with air treatment equipment, and automated valves (not visible in FIGS.) can be configured such that any air cleaning device 53 can be utilized initially. That is, a more elaborate piping system is contemplated than that depicted in FIG. 4 which was intentionally illustrated with a streamlined piping arrangement for clarity's sake. It must be noted that MAACS is intended to process vast volumes of polluted ambient air continuously, so that the conduits 52 and 54, as well as other elements of the on-board piping system are extremely huge in size, for example 5-6 feet in diameter.

Figure 3:
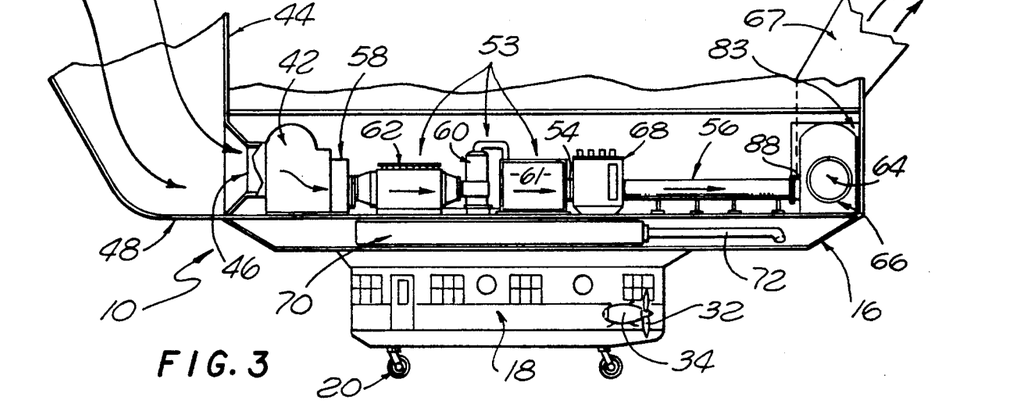
FIG. 3 is a fragmentary, cross-sectional view taken generally on line 3—3 of FIG. 2, illustrating with arrows an air flow pathway from the air intake ducts, through a plurality of different air cleaning devices contained within the housing and out through air exhaust ducts, also showing a waste storage bin disposed beneath the air cleaning devices.

The plurality of different air cleaning devices 53 provided within the housing 16 are best viewed in FIGS. 3-4. The initial selection of which types of air cleaning devices 53 are to be employed onboard MAACS should be based on extensive background sampling of the local environmental air quality problem. Each MAACS can be custom designed to clean a particular area with the design characteristics of its onboard air pollution equipment being dependent on the target pollutants to be removed by MAACS. The inclusion of a variety of different onboard air cleaning devices 53 enables MAACS to deal with pollutants in a variety of forms (gas, dust, vapor, aerosol) with a variety of particulate sizes. Moreover, just as the current trend in dirigible design is the incorporation of interchangeable cargo containers and passenger gondolas, the on-board air cleaning devices 53 can be removable to allow interchangeability of the air cleaning devices 53. This allows customization of MAACS for specialized applications, such as clean-up of a chemical spill of a particular gaseous pollutant. In such a scenario, any on-board air cleaning devices 53 which may be unappropriate for removing that pollutant which has been spilled may be either bypassed using the bypass conduits 52 of the onboard, automated piping system or may be removed entirely and replaced with another more effective air cleaning device. In order that a necessary air cleaning device may be added for specialized situations, such as a chlorine gas leak, without requiring the removal of air cleaning devices already in place, an empty space, generally indicated by reference numeral 56, is provided within the housing 16 for accommodating additional air pollution equipment. Added air cleaning devices are connected in fluid communication with the piping system of MAACS using auxiliary conduits.

Depending upon the types of air cleaning devices 53 employed in MAACS, it may increase efficiency of the pollution removal process executed by the present invention if means for gas preconditioning, such as preheaters, condensers, adiabatic water spray chambers or filter aids are included. As advised earlier, care must be exercised to avoid increasing the concentrations of collected pollutants to explosive levels during the intake, cleaning or exhaust stages of said pollution removal process.

The selection of which types of air cleaning devices to utilize aboard MAACS is somewhat dependent upon the climate/weather of the polluted area to be cleaned. For example, in a high temperature, high relative humidity atmosphere, a wet scrubber is preferred, while wet processes carried out by the wet scrubber may be unappropriate in cold climates due to freeze-up or condensation. Among the recommended types of air cleaning devices 53 which may be selected for use aboard MAACS are wet scrubbers, fog scrubbers, sorption process machines, mechanical particulate collectors, filtration machines, fabric filters, spray chambers, fiber bed scrubbers, settling bins with internal impingement baffles, adsorbent beds, preferably disposable activated carbon beds, mechanical scrubbing apparatus, cross-flow scrubbers, air washers and reactive scrubbing apparatus, to name the preferred air cleaning devices. For safety reasons, those machines which undertake combustion processes are not recommended.

Gaseous contaminants in the air intake flow can be removed by machines that utilize sorption processes such as solubility, reactive scrubbing, absorption, or chemisorption. However, care must be exercised in selecting processes involving reaction chemistry in order to avoid selection of a process requiring chemicals deemed toxic themselves. It is not advised to utilize processes requiring chemicals which could prove hazardous if released into the atmosphere so that the airborne air cleaner of the present invention can never itself be a carrier of pollutants into the atmosphere. If a reactive scrubbing machine is included aboard MAACS, the reagent utilized should be recovered and recycled in any conventional manner.

The initial step in treating ambient air to reduce the pollutant content therein, as practiced by MAACS, is to first remove large particulates suspended in the polluted air intake flow. Towards this end, precollector means for the removal of relatively large particulates, such as impingement collector separators, baffle type separators, spray impingement apparatus, or settling chambers are provided at the beginning of a series of air cleaning devices 53. Such precollector means is schematically represented in FIG. 4, designated by reference numeral 58.

Another particulate precollector system that may be employed aboard MAACS comprises one or more cyclones, preferably a multiple set of cyclones operating in parallel to handle a large gas stream. Since collection of smaller sized particles is also sought, relatively small diameter, long taper cyclones are preferred. Although a cyclonic precollector arrangement will achieve the removal of suspended solids in the ambient air (and thus help reduce smog), conventional dry cyclones are not effective in removing gaseous contaminants and have considerable energy requirements. For these reasons, one or more cyclonic spray scrubbers 60 are preferred over dry cyclones for use in MAACS. The cyclonic spray scrubber 60, also referred to as a cyclonic scrubber or a wet cyclone, provides an effective way for MAACS to remove aerosol vapor from the atmosphere. When a wet cyclone 60 is incorporated as an air cleaning device 53 aboard MAACS, it should be followed with at least one mist separator, an entrainment separator or demister in order to reclaim scrubber liquid utilized by the wet cyclone.

One type of MAACS is envisioned as being customized to remove aerosol vapors from the ambient air, in which case a plurality of cyclonic spray scrubbers and air washers 61 are employed within the housing 16. The preferred form of air washer 61 for use in MAACS comprises a huge, hollow shell in fluid communication with the air intake system. A packed bed or fiber pad is disposed within the hollow shell, as well as a plurality of nozzles that provide an air washing spray inside the shell. The nozzles are located within the shell at positions suitable for showering scrubbing liquid upon the fiber pad or packed bed. The use of air washers is especially suitable for achieving aerosol removal using MAACS.

The use of scrubbing liquids, particularly water, is a cornerstone air cleansing technique comprising an integral part of MAACS's overall operational scheme for effecting air pollution removal. That is to say, the various types of air pollution equipment which can be catagorized as wet scrubbers are most preferred for use aboard MAACS. This is because wet scrubbers provide an advantage over various other pollution removal devices, namely the operational characteristic of effecting simultaneous removal of both gaseous contaminants and solid or liquid particulates. Generally speaking, many other types of air cleaning devices are efficient primarily in removing either gaseous pollutants or solid/liquid particulates, rather than both at once.

The ability of wet scrubbers to remove both gaseous pollutants and solid or liquid particulates (liquid particulates being the spectrum of various aerosols) brings great flexibility in the pollution removal performance achievable by MAACS. When the emphasis is on particulate collection, the velocity of the intake gas stream entering the wet scrubber is increased using adjustable speed scrubber fans. This mode of usage is for MAACS clean-up of an area heavy in particulates, such as soot clouds above industrial smokestacks. When gas absorbtion is necessary for cleaning up atmospheric contaminants, the intake gas velocity of the wet scrubber is reduced, thereby providing for a longer residence time of the dirty gas in the scrubber and an accompanying increase in efficiency.

The preferred scrubbing liquid for use aboard MAACS is water. Other scrubber liquids may be preferred when encountering a particular pollutant, however, any scrubber liquid employed should include a neutralizing agent to help minimize the enormous corrosive potential of some atmospheric pollutants. The constant flow of water utilized in wet scrubbers serves as a fire retarding action when MAACS is processing ambient air laden with flammable pollutants. Thus, should any problem develop when MAACS is utilizing on-board wet scrubbers to eliminate flammable pollutants, the wet scrubber units are self-extinguishing. Among the factors to keep in mind when customizing MAACS with wet scrubbing apparatus are the high power consumption and thus, operating costs associated therewith, and the tradeoff that the finer the particulate that is removed, the higher the power consumption. The energy requirements associated with operating wet scrubbers, as well as all other air cleaning devices discussed herein for use aboard MAACS, are met, in part, through solar energy collected by the solar panels 30.

Since the ambient air is besieged with multiple pollution problems involving a plurality of contaminants, the utilization of a vast wet scrubbing system aboard MAACS is advantageous because this system can provide gas absorption, particulate removal and reactive processing simultaneously. Both differential wet scrubbers, (such as packed or plate towers (preferably tunnels), packed cross-flow units, such as cross-flow scrubber 62 having internal baffles, or floating bed scrubbers), as well as integral wet scrubbers (such as rectangular spray chambers, cyclonic units, fog scrubbers, venturi scrubbers, ejector scrubbers, and orifice types) are contemplated for inclusion among the air cleaning devices 53 utilized by MAACS. Ideally, differential and integral scrubbers should be used in series within the housing 16 for improved overall system efficiency. Venturi scrubbers are least desirable among the aforementioned scrubber types due to the high pressure drop, high power consumption, and high operating cost associated therewith. Ejector scrubbers have similarly disadvantageous energy requirements.

Note above that packed or plate tunnels are preferred to towers. This is because a horizontal air flow through an onboard tunnel-like apparatus is more easily achieved using the air intake system of MAACS than is a vertical air flow through a tower-like apparatus. Another factor along these lines is that the movement of the dirigible 12 of MAACS in a horizontal path readily draws a flow of ambient air into the collector hood 38. For these reasons, many conventional types of air pollution equipment would be more compatible for use in MAACS if configured for processing a horizontal air flow rather than a vertical air flow. As is readily apparent when viewing FIG. 3, the flow pathway connecting the air intake ductwork 44 and the air intake inlets 46 in fluid communication with an air exhaust outlet 64 and air exhaust ductwork 66 follows a generally horizontal route. The cross-flow scrubber 62 is ideally suited for processing a horizontal air flow.

As with conventional scrubbers, the wet scrubbers employed aboard MAACS require high velocity, adjustable speed fans. For safety reasons, the scrubbing apparatus of MAACS should be sparkproof in case flammable air pollution is encountered. Thus, scrubber fans should include all-bronze bearings to reduce sparks. Since MAACS is designed for prolonged, continuous use in air cleaning service, on-board scrubbers should include easily replaceable wear plates at points where the dirty gas stream being treated impacts on scrubber walls.

A beneficial feature of MAACS is the provision of on-board water treatment equipment 68 for recycling dirty scrubber fluid. This provision for reclaiming spent scrubber fluid in mid-flight so that it is reusable in further scrubbing operations enables MAACS to remain operational and airborne for prolonged periods because the periodic contamination of scrubber fluid does not require the dirigible 12 to land. However, despite on-board scrubber liquid recycling, occasional replenishment of scrubber fluid will be necessary during docking of the dirigible 12 because some fluid will always be lost during normal operations. Recirculating lines for scrubber liquid streams must be insulated for MAACSs used in colder climates. The governing factor in determining the extent of the water (or scrubber liquid) treatment equipment which is to be incorporated aboard MAACS is the available payload weight supportable by the dirigible 12. This is dependent upon the number and weight of the on-board air cleaning devices 53 already comprising the payload. If only limited water treatment equipment is to be provided within MAACS, it is desirable to at least provide on-board pretreatment to remove process solids because effluent is then already pretreated for further purifying in a ground wastewater facility. Alternatively, scrubber fluid which has become saturated with contaminants can be stored in an on-board tank and held for later treatment in a ground facility.

Wet scrubbers aboard MAACS must have a drainage sump associated therewith to collect particles removed from the ambient air processed by MAACS. This sump must be periodically emptied of waste during docking of the dirigible 12. Since the pollution removal processes of most types of air cleaning devices 53 contemplated for use in MAACS, as well as the treatment processes executed by wet scrubbers, result in the formation of a waste precipitate, a giant hopper, settling bin or waste storage tank 70 (FIG. 3) is provided within the housing 16. This enlarged waste storage tank 70 is positioned directly beneath the on-board series of air cleaning devices 53 such that each individual air cleaning device 53 drains its waste into the central waste tank 70. When settling bins are operatively associated with the air cleaning system provided by MAACS, impingement baffles or louvers should be included to increase the efficiency of particle collection from gases. A waste piping system 72 having pumping means (not shown) is provided within the housing 16 for allowing the waste storage tank 70 to be periodically emptied. The waste piping system 72 discharges through one or more waste hatches 74 (FIG. 1). Wet scrubbing operations aboard MAACS will remove small diameter (greater than 25 $\mu M$) particles and will produce a sludge that is routed to the waste storage tank 70.

Among the types of air cleaning devices 53 designated for use aboard MAACS are wet scrubbers that include packed beds, mechanical scrubbers, and fiber bed scrubbers which offer the advantages of high surface area and a low operational pressure drop. Fiber bed scrubbers are best placed proximate the exhaust end of the series of air cleaning devices rather than the air intake end. When more sophisticated pollution removal methods are needed to clean-up a particular pollutant, the use of reactive scrubbing apparatus aboard MAACS offers contaminant removal by solubility and chemical reaction. Although their use is not the preferred mode, reactive scrubbers may necessarily have to be employed to control halogens, halogen acids, odors, sulfur oxides and hydrogen sulfide in the atmosphere. Recommended scrubbing reagents for use in reactive scrubbing processes executed by MAACS are potassium permanganate, sodium hypochlorite, lime water, and sodium bisulfite. Chlorine and chlorine dioxide should be utilized as scrubbing reagents only when the required environmental clean-up absolutely demands their usage. When MAACS is required to neutralize a chlorine spill, caustic scrubbing procedures and technologies are appropriately included in a customized air cleaning airship model.

As mentioned previously, the climate within which a particular MAACS is to be employed is a factor to be considered when selecting the types of air cleaning devices 53 to be included when customizing a MAACS for a particular specialized application. In dry climates, fabric filters may be employed in MAACS to remove particulates in the atmosphere. However, in humid climates, fabric filters are preferably ommitted from MAACS because humidity will cake particulates to the fabric filter, thereby blinding the fabric and rendering it ineffective as a filtering medium. The fabric filters should be utilized in a multilayer arrangement having multiple thick fibers in each layer in order to avoid bleeding, i.e. penetration, of fine particulates through the fabric material. The fabric filter can be any conventional filter medium, however, heat set fabrics or fabrics which have been precoated to withstand chemical attack and/or precoated to promote thermal durability are preferred.

The support structure for fabric filters employed in MAACS should include means for preventing triboelectrification, a static electric force which builds up on the surface of dry fabrics as the result of particle movement and which can actually polarize the fabric to ultimately repel microparticulates. Means for static charge bleedoff are necessary to prevent triboelectrification. As with other types of air cleaning devices 53, fabric filters require an associated waste collection hopper which is provided by the waste storage tank 70. The dirtying of the fabric filters may be monitored by a crew aboard MAACS so that periodic filter replacement may be effected. Optionally, the surface of fabric filters utilized in MAACS may be cleaned continuously by pulse jets. Preferably, air pressure provided by the air intake system and air exhaust system of MAACS can be routed to provide air jets for cleaning fabric filters. The air cleaning technology employed aboard MAACS can also include devices for carrying out absorption processes, i.e. processes involving the transfer of molecules from a gaseous state to a liquid state. Foremost in usefulness in this catagory are spray chambers which shower the polluted air intake stream entering MAACS with an absorbent liquid. Any absorbent liquid selected for use in MAACS should not create an air pollution problem itself. It should preferably have low volatility, be nontoxic, inexpensive, noncorrosive, nonflammable and possessing high stability. The other selection criteria pertains to the desired reactive characteristics (or lack thereof) of the absorbent liquid. Generally speaking, absorbers are not very effective in particulate control; this fact should be kept in mind if customizing a MAACS for that particular function.

Also among the air cleaning devices which may be employed aboard MAACS are entrainment separators, including packed demisters and crossflow scrubbers containing packing or fiber mesh. Wet cyclones fall into this catagory also. Entrainment separators will drain to the waste storage tank 70.

MAACS may include apparatus for carrying out adsorption processes to effect pollution removal, for example, the dissolution of sulfur dioxide in water. Although possible, the use of adsorption processes in MAACS is not preferred because adsorption processes for air pollution control are generally limited to higher molecular weight compounds at temperatures below 125° F. Any on-board adsorption process technology should immediately follow the initial step of particulate collection executed by MAACS. This practice helps avoid particulate blinding of active sites of an adsorbing bed, or the like.

One approach is to include a giant adsorbing solid bed in a location within housing 16 that is in fluid communication with air intake flow into MAACS. If MAACS is to include an adsorbing element, deep adsorbent beds, preferably comprised of activated carbon, and configured to provide gigantic surface areas, should be utilized. The adsorbent beds should possess a high degree of retentivity and capacity, and should be throwaway, disposable beds because adsorbing surfaces of a bed will periodically become saturated while cleaning large volumes of air. The fact that adsorbent beds become exhausted eventually and thus are no longer retentive of pollutants is an important consideration when selecting the type of air cleaning devices to be employed aboard MAACS. Because of the heavy pollution to be encountered by MAACS, inclusion of adsorbent beds may have to be in the context of a regenerative system wherein a multi-bed arrangement is utilized with some adsorbent beds being regenerated by steam or vacuum stripping while other beds are in use cleaning the atmosphere. It should be noted that disposable adsorbent beds are preferred even over a regenerative system because of the energy requirements of the latter.

Although most types of land-based air pollution equipment, such as those previously mentioned, are adaptable for inclusion with MAACS, the use of electrostatic precipitators is undesirable for a number of reasons. Foremost, is the disadvantageous high voltage requirements for electrostatic precipitators and the fact that combustible particulates or the presence of flammable gas, even in trace amounts in a bulk intake flow, can be a fire hazard in electrostatic precipitators. Another major drawback rendering electrostatic precipitators incompatible with MAACS are the unusually strict structural requirements needed to maintain the spacing of the electrodes of an electrostatic precipitator. This means that electrostatic precipitators are unappropriate for dealing with a high inlet air velocity (such as the air intake velocity of gases being funneled into MAACS via the collector hood 38) because such a blowing action causes wires of the electrostatic precipitator to drift, thereby undesirably changing the spacing of the electrodes which gives rise to sparking and an increased power drain. Other problems associated with electrostatic precipitars that provide the basis for its exclusion from MAACS are extremely high operating temperatures (between 200°-850° F.), back corona, particle reentrainment, wire breakage, electrode ground-out and flapping electrodes.

At the exhaust end of the series of air cleaning devices 53 aboard MAACS, (i.e. the end of the processing line just prior to the origin of the air exhaust system that directs treated air from the air cleaning devices to the atmosphere) and above all sprays and packed sections included in MAACS, the airflow being processed should be passed through at least one mist eliminator to remove any entrained substances and avoid carry-over of any scrubber solutions into the ambient air. Mist eliminating means are suitably employed at the end of the air processing system provided in MAACS so as to serve as a final contact zone for absorption of any remaining pollutants in the air stream being treated. The mist eliminating means for removing entrained pollutants by impingement preferably utilize a filament maze blanket that comprises a mesh filter for removing mists and particulates.

Figure 5:
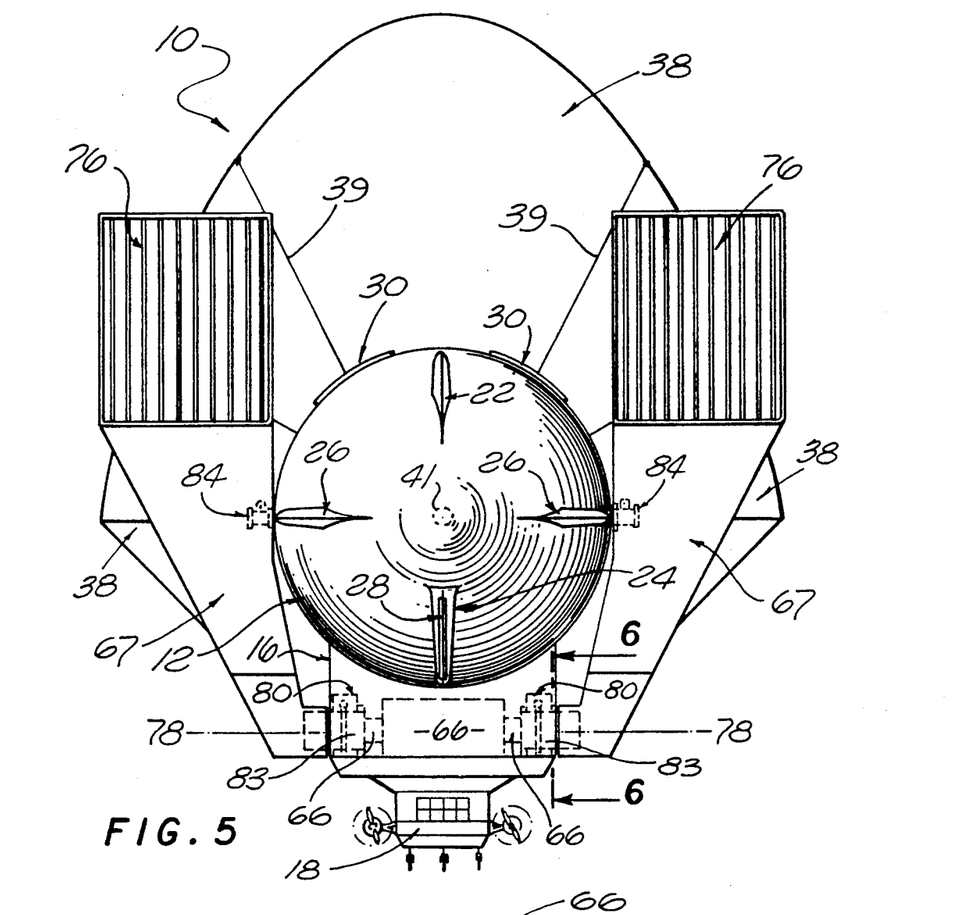

Once onboard pollution removal processes have been executed by whatever air cleaning devices 53 are employed in MAACS, its air exhaust system serves to channel a processed, purified air flow back to the atmosphere. To accomplish this, giant movable air exhaust ducts 67 are pivotably mounted to exterior, rearward portions of the dirigible 12, as best viewed in FIGS. 1 and 5. The external air exhaust ducts 67 are maintained in fluid communication with the bypass conduits 52 and the conduits 54 by air exhaust ductwork 66 which is disposed within the housing 16 (see FIG. 4). Auxiliary motorized fans may be incorporated at selected points within the air exhaust ductwork 66 to promote airflow therethrough. The air exhaust system of MAACS may include cooling elements to ensure that exhausted, purified air is not too hot in temperature. Preferably, a conventional cooling element can be employed to capture heat in the exhaust stream, using coils, for example, and thereby enable this energy to be recycled.

Figure 6:
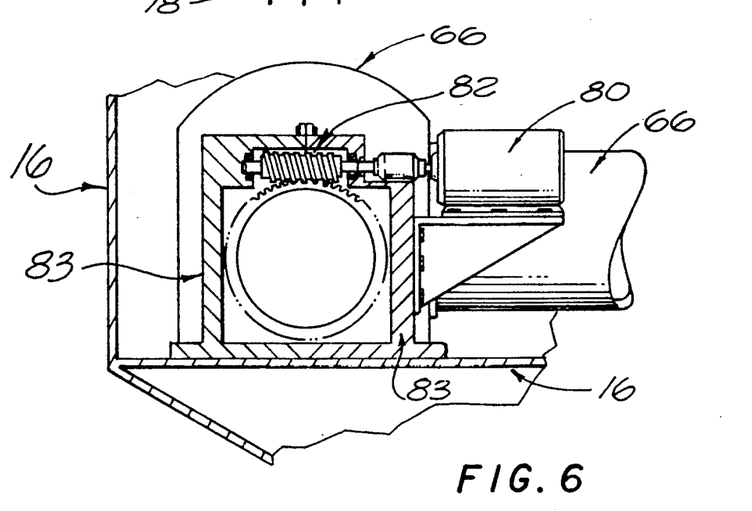
FIG. 6 is a fragmentary, cross-sectional view taken generally on line 6—6 of FIG. 5, further depicting a motorized worm gear type drive arrangement for imparting pivotal motion to the exhaust ducts of FIG. 5.

An advantageous feature of MAACS is provided by the pivotably movable exterior exhaust ducts 67 which allow the purified air flow exiting MAACS through exhaust ports 76 (FIG. 5) to be harnessed as a secondary propulsion source for steering the dirigible 12 and/or aiding in its ascent or descent. Towards this end, the exterior exhaust ducts 67 can be rotated about an axis of rotation 78 by at least one motor 80 disposed within the housing 16. As depicted in FIG. 6, the motor 80 provides drive means for turning, for example, a worm gear arrangement 82 that in turn is operatively connected with the pivotable exhaust ducts 67 for imparting rotational movement thereto. Preferably, at least one motor 80 is provided to drive each of the exhaust ducts 67. The gear arrangement 82 may be any type of gear arrangement suitable for rotating the exhaust ducts 67 from a raised position (shown in solid outline in FIG. 1) to a lowered position (shown in phantom outline in FIG. 1). Suitable gear arrangements are not extensively enumerated herein because the gear and motor arrangement comprising the drive system for moving the exhaust ducts 67 of M;.ACS can be provided in any conventional manner by those skilled in that art. The gear arrangement 82 is contained within gear and bearing housings 83 (FIG. 4).

In order to aid in the raising and lowering of the pivotable exterior exhaust ducts 67, winches 84 are provided at exterior positions on the envelope assembly 14. Preferably, the winches 84 (at least one for each exhaust duct 67) are anchored to an interior dirigible framework (not visible) similar to the nose framework 36. The winches 84 provide retractable, extendable cables 86 that are attached to the exhaust ducts 67. Raising or lowering the exhaust ducts 67 is facilitated by extending or retracting the cables 86 using the winches 84. To further ensure that the entire burden of moving the gigantic exhaust ducts 67 does not fall upon the motors 80, one or more extendable, hydraulically actuated arms 87 (preferably of the telescopic variety as illustrated in FIG. 1) are exteriorly attached to the housing 16 at one end and to an exhaust duct 67 at an opposite end. The extension or retraction of the hydraulic arms 87 aids in the raising or lowering of the exhaust ducts 67. A conventional hydraulic power source is included within the housing 16 to actuate the extendable arms 87.

Movement of the exterior exhaust ducts 67 to a raised position will upwardly direct a purified air flow exiting MAACS, thereby harnessing said exiting air flow as a secondary propulsion source which aids in the descent of the dirigible 12. Similarly, movement of the exhaust ducts 67 to a lowered position (using the winches 84, the hydraulic arms 87, and the motors 80 as a coordinated system) will downwardly direct the airflow exiting MAACS, thereby utilizing the exiting air flow as a secondary propulsion source which aids in the ascent of the dirigible 12. The principle at work here is that the dirigible will experience a propulsion boost that causes the dirigible to float in the direction which is opposite the direction that the exiting air flow is traveling. Furthermore, the exhaust ducts 67 may be positioned such that the purified air flow exiting the exhaust ports 76 is traveling along a relatively horizontal pathway, thereby inducing the dirigible to drift horizontally in the opposite direction.

Sensing means 88 are provided in fluid communication with the internal exhaust ductwork 66 so that a final quality check on the air purity achieved by the pollution removal process executed by MAACS can be run before the treated air enters the exterior exhaust ducts 67 and re-enters the atmosphere. If the purity levels achieved by MAACS's treatment of ambient air fail to comply with predetermined air quality standards, the treated air may be recycled back to one or more selected air cleaning devices 53 for further treatment. This recycling procedure, which is optional, is executed by the on board piping system and the automatic control means which actuate the automated valve system to route the less-than-pure air flow to desired treatment devices 53.

In a highly sophisticated version of MAACS designed for processing highly toxic substances, a negative pressure exhaust system is recommended so that leaks will be inboard. In this scenario, the primary exhaust gas mover should be placed as close to the final exhaust point as possible. With inboard leaks, there is no external contaminant loss, i.e. no spewing of pollutants back into the atmosphere. The crew members aboard a MAACS customized with a negative pressure exhaust system should be provided with gas masks as a precautionary measure.

The air intake system of MAACS can incorporate air scoop means for ballonet inflation of the dirigible 12. That is, ambient air collected by the collector hood 38 may be channeled to either a ballonet arrangement within the envelope assembly 14 (for inflation thereof) or to the air cleaning devices 53. Other features deemed conventional in the safe design of airships are not enumerated herein for they are not the subject of the present invention and are known to those skilled in the art.

As a final guideline, when collecting contaminants from the atmosphere using MAACS, care must be taken to keep the contaminant concentrations less than one-fourth of their lower explosion limits (L.E.L) for safety purposes.

From the foregoing, it will be appreciated that the mobile airborne air cleaning station of the present invention provides means for actually removing those pollutants which foul our atmosphere high above ground level. The present invention advantageously can be positioned directly within dense smog or directly above industrial spills of gaseous pollutants. The hovering ability, prolonged flight times and slow flight speeds achievable with the dirigible transporting MAACS are operational characteristics which lend themselves well to airborne air cleaning operations. Advantageously, the use of a dirigible in MAACS also enables the present invention to function in a manner which interjects little or no additional noise pollution or air pollution into the surrounding environment. The MAACS beneficially executes an on-board analysis of prevailing pollution conditions so that an optimum air cleaning approach may be selected. This points to yet another advantage of MAACS, namely its provision of a plurality of different on-board air cleaning devices so that MAACS is equipped to deal with the wide variety of pollutants present in the ambient air. Furthermore, MAACS beneficially harnesses a purified air flow exiting therefrom for use as a secondary propulsion force aiding in the movement of the dirigible through the sky. Perhaps the strongest argument pointing to the urgent necessity to begin employing MAACS in a massive airborne air cleaning campaign is the current estimate that between 5 million and 10 million Americans will get sick or die prematurely in 1990 due to dirty air.

While a particular form of the invention has been illustrated and described, it will be apparent that various modifications can be made without departing from the spirit and scope of the invention. Accordingly, it is not intended that the invention be limited, except as by the appended claims.

We claim:

1. A mobile airborne pollution removal system comprising:

air cleaning means for removing pollutants from ambient air, thereby producing purified air;

dirigible means for airborne transportation of said air cleaning means while said air cleaning means effects pollution removal from the ambient air;

support means for enabling said dirigible means to transport said air cleaning means;

air intake means for directing ambient air to said air cleaning means;

air exhaust means for directing a purified air flow from said air cleaning means to the atmosphere; and means for utilizing said purified air flow as a propulsion source for said dirigible means.

2. An airborne pollution removal system as set forth in claim 1, wherein said air exhaust means comprises one or more movable exhaust ducts, each having an exhaust port at a distal end thereof, said dirigible means including positioning means for adjustably positioning one or more exhaust ducts relative to said dirigible means such that the purified air flow exiting said air exhaust means is exhausted in a selected direction corresponding to the positioning of said exhaust ports, thereby providing a selectively directable purified air flow which functions as a directable propulsion force for use in steering said dirigible means, wherein use of said positioning means to adjustably position one or more exhaust ducts enables said directable propulsion force to be aimed in a desired direction corresponding to a desired steering adjustment for said dirigible means.

3. An airborne pollution removal system as set forth in claim 2, wherein said support means includes a housing which contains said air cleaning means, wherein said exhaust ducts are pivotably attached to said housing, and wherein said position means comprises one or more telescopic arms, each having a first end pivotably attached to said housing and a second end attached to one of said movable exhaust ducts.

4. An airborne pollution removal system as set forth in claim 3, further including means for hydraulically actuating said telescopic arms.

5. An airborne pollution removal system as set forth in claim 2, wherein said positioning means comprises one or more winches, and wherein said movable exhaust ducts are attached to, and are positionable by, one or more retractable cables which extend from said winches.

6. An airborne pollution removal system as set forth in claim 2, wherein said movable exhaust ducts are movable by said positioning means to a position whereat said exhaust ports direct the purified air flow upwardly, thereby enabling said upwardly directed purified air flow to be utilized as a propulsion force aiding in the descent of said dirigible means.

7. An airborne pollution removal system as set forth in claim 2, wherein said movable exhaust ducts are movable by said positioning means to a position whereat said exhaust ports direct the purified air flow downwardly, thereby, enabling said downwardly directed purified air flow to be utilized as a propulsion force aiding in the ascent of said dirigible means.

* * * * *